US009099895B2

(12) United States Patent  (10) Patent No.: US 9,099,895 B2
Atallah et al.  (45) Date of Patent: Aug. 4, 2015

(54) MAGNETIC POLE-PIECE STRUCTURE

(75) Inventors: Kais Atallah, Sheffield (GB); Richard Edward Clark, Sheffield (GB); Jan Jozef Rens, Sheffield (GB)

(73) Assignee: Magnomatics Limited, Sheffield (GB)

( * ) Notice: Subject to any disclaimer, the term of this patent is extended or adjusted under 35 U.S.C. 154(b) by 330 days.

(21) Appl. No.: 12/992,141

(22) PCT Filed: May 12, 2009

(86) PCT No.: PCT/GB2009/001175
§ 371 (c)(1),
(2), (4) Date: Feb. 7, 2011

(87) PCT Pub. No.: WO2009/138725
PCT Pub. Date: Nov. 19, 2009

(65) Prior Publication Data
US 2011/0133594 A1  Jun. 9, 2011

(30) Foreign Application Priority Data

May 12, 2008 (GB) .................................. 0808524.3

(51) Int. Cl.
| H02K 1/06 | (2006.01) |
| H02K 51/00 | (2006.01) |
| H02K 1/08 | (2006.01) |
| H02K 49/10 | (2006.01) |
| H02K 1/02 | (2006.01) |

(52) U.S. Cl.
CPC ................ *H02K 1/08* (2013.01); *H02K 49/102* (2013.01); *H02K 51/00* (2013.01); *H02K 1/02* (2013.01)

(58) Field of Classification Search
CPC ....... H02K 51/00; H02K 49/102; H02K 1/08; H02K 1/02; H02K 1/148
USPC ............... 310/216.113, 216.114, 216.115, 310/216.118, 216.124
See application file for complete search history.

(56) References Cited

U.S. PATENT DOCUMENTS

| 6,091,172 | A | * | 7/2000 | Kakinuma et al. ............... 310/71 |
| 6,150,747 | A | * | 11/2000 | Smith et al. ............ 310/216.137 |
| 7,105,976 | B2 | * | 9/2006 | Stewart et al. ......... 310/216.074 |
| 7,116,031 | B2 | * | 10/2006 | Ahn ....................... 310/216.114 |
| 7,262,540 | B2 | * | 8/2007 | Lee ........................ 310/216.004 |
| 7,271,512 | B2 | * | 9/2007 | Lee et al. ......................... 310/43 |

(Continued)

FOREIGN PATENT DOCUMENTS

| DE | 20008322 | 8/2000 |
| DE | 10121709 A1 * | 11/2001 |

(Continued)

OTHER PUBLICATIONS

K. Atallah, S.D. Calverley and D. Howe; Design, analysis and realisation of a high-performance magnetic gear; IEE Proceedings: Electric Power Applications, Institution of Electrical Engineers, vol. 151, No. 2, Mar. 9, 2004.

Atallah et al., "A novel high-performance magnetic gear", IEEE Transactions on Magnetics, Jul. 2001, vol. 37, No. 4, 2844-2846.

*Primary Examiner* — Alex W Mok
(74) *Attorney, Agent, or Firm* — Baker & Hostetler LLP (57) ABSTRACT

In order to provide a magnetic pole-piece having good immunity to eddy currents while providing a high torque rating there is provided a magnetic pole-piece (60) comprising a magnetic part (64) and a retaining part (62), wherein the retaining part (62) supports the magnetic part (64).

28 Claims, 9 Drawing Sheets

(56) References Cited

U.S. PATENT DOCUMENTS

| | | | |
|---|---|---|---|
| 7,294,942 B2 * | 11/2007 | Lee et al. | 310/43 |
| 7,307,825 B2 * | 12/2007 | De La Fuente De Ana et al. | 361/212 |
| 2004/0108781 A1 | 6/2004 | Razzell et al. | |
| 2005/0040712 A1 * | 2/2005 | Hazelton | 310/12 |
| 2005/0077802 A1 | 4/2005 | Toujima et al. | |
| 2008/0149445 A1 | 6/2008 | Kern et al. | |

FOREIGN PATENT DOCUMENTS

| | | |
|---|---|---|
| EP | 1353436 | 10/2003 |
| EP | 1528659 | 5/2005 |
| EP | 1936238 | 6/2008 |
| GB | 2437568 A * | 10/2007 |
| GB | 2439111 A * | 12/2007 |
| WO | WO 2007/125284 | 11/2007 |
| WO | WO 2007125284 A1 * | 11/2007 |

* cited by examiner

FIGURE 1

Prior Art

MAGNETIC POLE-PIECE STRUCTURE

CROSS REFERENCE TO RELATED APPLICATIONS

This application claims the benefit of International Application No. PCT/GB2009/001175 filed May 12, 2009, having a claim of priority to GB patent application number 08 08524.3, filed May 12, 2008.

The present invention relates, in general, to novel designs of magnetic pole-piece structures used for magnetic gears and machines with integrated magnetic gearing such as the so-called pseudo direct drive machines. Particularly, the present invention provides magnetic pole-piece structures with a high mechanical strength and low conductivity. Such magnetic pole-piece structures have both a high-torque capability and can be employed in high torque machines whilst providing a reduction in eddy currents. It is desirable to reduce eddy currents as they are a loss mechanism within the gear or machine and reduce system efficiency.

Magnetic gears offer significant advantages compared with mechanical gears, such as no contacting surfaces, removing the need for lubrication, and hence reduced maintenance and improved reliability, inherent overload protection (as the gear harmlessly pole slips on over torque), and physical isolation between the input and output shafts. Providing the iron losses (e.g. due to eddy currents in the pole pieces) can be minimised, the magnetic gear is also highly efficient.

A magnetic gear topology which combines a high torque transmission capability and high efficiency is disclosed in WO 2007/125284, the contents of which are incorporated herein in their entirety.

Figure 1:
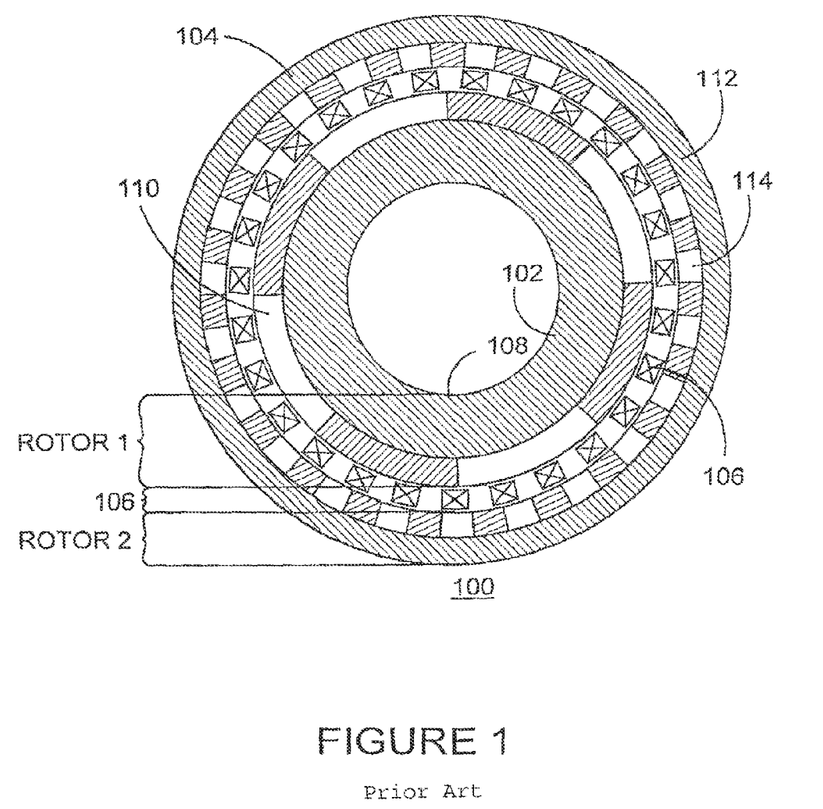
FIG. 1 is a schematic diagram of a rotary magnetic gear according to the prior art.

Referring to FIG. 1 of WO 2007/125284, a rotary magnetic gear 100 is provided by a first or inner rotor 102, a second or outer rotor 104 and a number of pole pieces 106. The first rotor 102 comprises a support 108 bearing a respective first number of permanent magnets 110. In the illustrated magnetic gear of FIG. 1, the first rotor 102 comprises 8 permanent magnets or 4 pole-pairs arranged to produce a spatially varying magnetic field. The second rotor 104 comprises a support 112 bearing a respective second number of permanent magnets 114. The second rotor 104 illustrated comprises 46 permanent magnets or 23 pole-pairs arranged to produce a spatially varying field. The first and second numbers of permanent magnets are different. Accordingly, in the absence of the pole-pieces there will be little or no useful magnetic coupling or interaction between the permanents magnets 112 and 114 and there will be no net torque such that rotation of one rotor will not cause rotation of the other rotor.

The pole pieces 106 are used to allow the fields of the permanent magnets 110 and 114 to couple together and transmit torque. The pole pieces 106 modulate the magnetic fields of the permanent magnets 110 and 114 so they interact to the extent that rotation of one rotor will induce rotation of the other rotor in a geared manner, i.e. the speed will be increased/decreased and the torque will be decreased/increased.

Within a gear, two of the three elements are rotating and one is held static. The inner high speed rotor is usually rotating, driven by the high speed input/output shaft and one of either the pole pieces or outer magnets can be the other rotor, (low speed), with the other held static. These two arrangements offer a different gear ratio (similar in operation to a planetary gear). However, in a pseudo direct machine, in which the gear has been integrated into an electrical machine, the pole pieces are the low speed rotating element.

One skilled in the art understands how to select and design the pole pieces 106, given the first 110 and second 114 permanent magnets, to achieve the necessary magnetic circuit or coupling such that gearing between the first 102 and second 104 rotors results as can be appreciated from, for example, K. Atallah, D. Howe, "A novel high-performance magnetic gear", IEEE Transactions on Magnetics, Vol. 37, No. 4, pp. 2844-2846, 2001 and K. Atallah, S. D. Calverley, D. Howe, "Design, analysis and realisation of a high performance magnetic gear", IEE Proceedings—Electric Power Applications, Vol. 151, pp. 135-143, 2004, which are incorporated herein by reference in their entirety.

In alternative embodiments, an electrical motor/generator combined with a magnetic gear can be provided. Additionally, the pole-pieces included in the arrangement can be fixed as a stator or rotatable as a rotor themselves. An example of such an arrangement is provided in FIG. 2, which shows the principle of operation of such an electrical machine 200.

Figure 2:
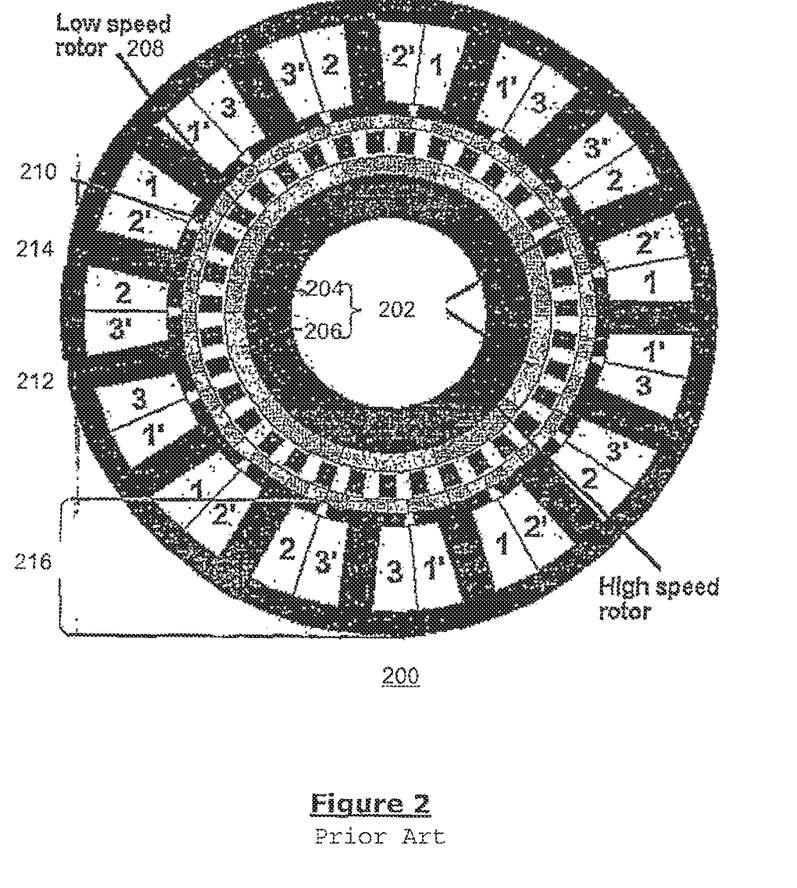
FIG. 2 is a schematic diagram of a combined electrical machine and magnetic gear according to the prior art.

The electrical machine 200 comprises a first or inner rotor 202 having a support 204 bearing a first plurality of permanent magnets 206. In the embodiment shown, permanent magnets having 10 poles are used. However, embodiments are not limited to using such a number of permanent magnets. Embodiments can be realised that use some other number of permanent magnets. The electrical machine 200 comprises a second rotor 208 in the form of a plurality of ferromagnetic pole pieces. The pole pieces 208 are arranged to magnetically couple the permanent magnets 206 of the first/inner rotor 202 to a plurality of permanent magnets 210 that are fixed to a periphery of the wound stator in the region of the pole shoes 212 of respective teeth 214 thereby forming a stator 216. In the embodiment shown, 60 permanent magnets are fixed to the periphery of the wound stator 212. The embodiment comprises 15 teeth 214 with the respective periphery of the wound stator 212. It will be appreciated that embodiments are not limited to such a number of permanent magnets and teeth. Embodiments comprising some other number of permanent magnets and teeth can be realised.

The pole pieces 208 are rotatable, that is, they form a rotor. The inner rotor 202 is rotatable. The teeth 214 and associated permanent magnets 210 are fixed. The coupling between the permanent magnets 206 and the permanent magnets 210 is realised using the rotatable pole pieces 208. Associated with the stator 216 is a plurality of 3-phase windings 1, 1', 2, 2' and 3, 3'. The 3-phase windings, and associated currents, are arranged to create magnetic fields that to couple with or form magnetic circuits with the first or fundamental harmonic of the permanent magnets 206 associated with the inner rotor 202.

As is clear from the above, during mechanical design and manufacture, particular care must be given to the design of the magnetic pole-pieces.

First, the magnetic pole-pieces are subjected to time-varying magnetic fields. This causes a circulating flow of electrons, or current, within the conductor. These circulating "eddies" of current create a magnetic field that opposes the effect of the applied magnetic field. The stronger the applied magnetic field, or greater the electrical conductivity of the conductor, or greater the relative velocity of motion and rate of change of the field, the greater the currents developed and the greater the opposing field. Eddy currents transform useful forms of energy, such as kinetic energy, into heat, which causes a temperature rise and a reduction in efficiency.

Second, the magnetic pole pieces must have sufficient mechanical strength to transmit the maximum torque of the device.

In order to address and reduce the occurrence of eddy currents in the device, it is known to use either a laminated, sintered or composite soft magnetic material for a magnetic pole piece. However, such arrangements significantly reduce the mechanical strength of the pole-pieces. In order to improve the mechanical strength, it is known to use solid ferromagnetic steel pole-pieces; however these arrangements are subject to significant eddy currents. Usually, if laminated pole pieces are used they would be placed within a substrate, for example by casting/over-moulding them within a non magnetic, non conducting tubular structure. However, this reduces the flow of cooling air to the pole-pieces to remove any loss (due to eddy currents or hystersis loss) which can lead to a significant temperature rise within the structure.

Accordingly, it is an object of the present invention to provide a magnetic pole-piece having a high mechanical strength and which reduces the occurrence of eddy currents.

According to a first aspect of the present invention, there is provided a magnetic pole-piece having a high strength portion and a low-conductivity portion, the high strength portion provided by a retaining structure and wherein the retaining structure supports the low-conductivity structure.

Preferably, the low-conductivity structure is provided by an array of laminate parts or a soft magnetic composite material.

According to a second aspect of the present invention, there is provided a magnetic pole-piece having a high strength portion and a low-conductivity portion, the high strength portion provided by a retaining structure and the low-conductivity structure provided by an array of laminate parts or a soft magnetic composite material supported by the retaining structure.

According to a third aspect of the present invention, there is provided a magnetic pole-piece comprising a magnetic part and a retaining part, wherein the retaining part supports the magnetic part.

According to a fourth aspect of the present invention, there is provided a magnetic pole-piece comprising an array of laminate parts secured in place by a retaining structure.

According to a fifth aspect of the present invention, there is provided a magnetic pole-piece comprising a soft magnetic composite material secured in place by a retaining structure.

Embodiments of the invention will now be described, by way of example only, and with reference to the accompanying drawings in which:

FIG. 4b is a schematic diagram of alternative lamination directions for the laminated core of FIG. 4a;

FIG. 7b is a perspective view of the pole-piece of FIG. 7a;

FIG. 8b is a side view of the pole-piece of FIG. 8a;

FIG. 10c is a perspective view of a pole-piece of FIG. 10a.

Figure 3:
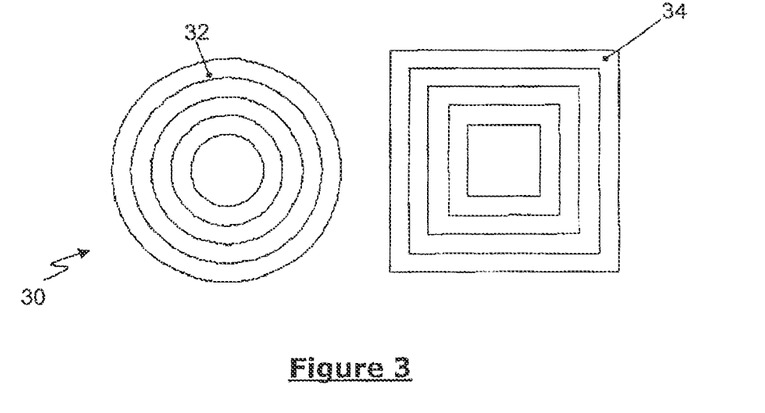
FIG. 3 is a schematic diagram of a concentric tube pole-piece structure according to a first embodiment of the invention.

Referring to FIG. 3, a pole piece structure 30 comprises a concentric tube pole-piece structure according to a first embodiment of the invention in both a circular 32 and rectangular 34 form. The inner-most or outer-most tube section (or combination) could be a non-magnetic, high strength component such as carbon-fibre composite tubes or rods. Adjacent sections of the structure can be insulated from each other by a spray varnish or may rely on poor surface contact to provide such insulation.

Figure 4A:
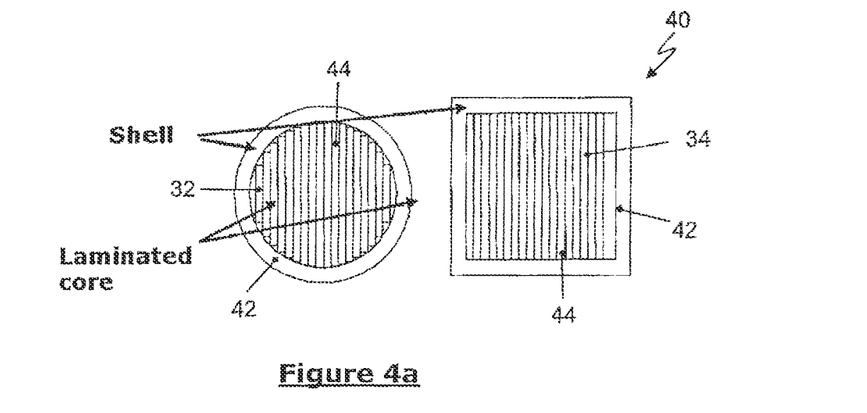
FIG. 4a is a schematic diagram of a shell with laminated core pole-piece structure according to a second embodiment of the invention.
Figure 4B:
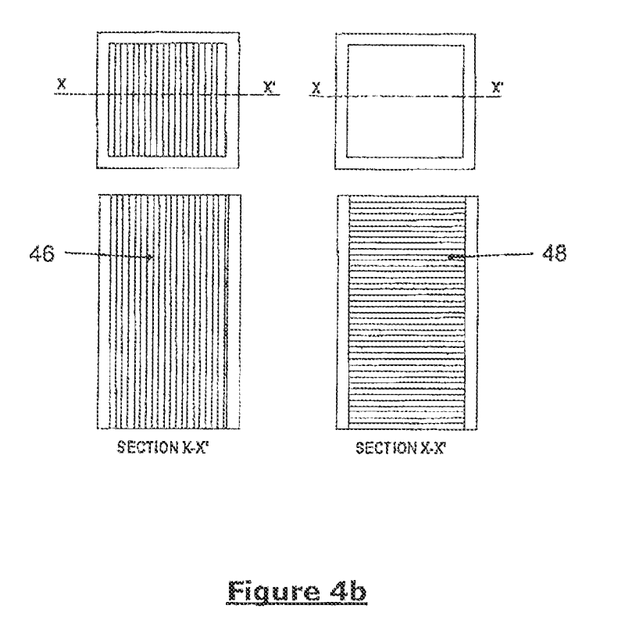

Referring to FIG. 4a, a schematic diagram of a shell with laminated core pole-piece structure 40 according to a second embodiment of the invention comprises a shell 42 filled with a laminated core 44. As described above in relation to FIG. 3, both a circular 32 and rectangular 34 form can be used. As best seen in FIG. 4b, the laminate core 44 within the shell 42 can be laminated in either the axial 46 or radial 48 directions. Circumferential laminations can also be employed (not shown in FIG. 4b).

Figure 5:
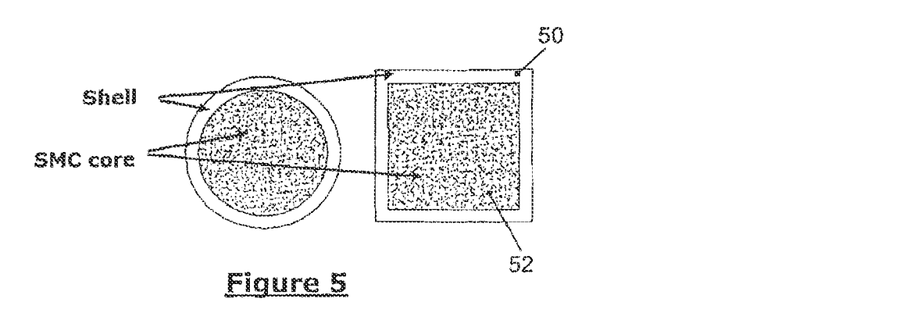
FIG. 5 is a schematic diagram of a shell with soft magnetic composite core pole-piece structure according to a third embodiment of the invention.

Referring to FIG. 5, a schematic diagram of a shell with soft magnetic composite core pole-piece structure according to a third embodiment of the invention comprises a shell 50 with core 52 manufactured from a Soft Magnetic Composite (SMC), which offers reasonable permeability and saturation flux density with low conductivities (near zero conductivity at the frequencies of interest).

Examples of suitable Soft Magnetic Composite materials include Somaloy (from Hoganas, Sweden) which is an iron powder, coated with an insulation layer, which is compacted under extremely high pressure. Various additives are used in small quantities to act as a lubricant and binder (such as Kenolube) and aid the compaction process.

The SMC can be moulded within the shell 50 or more preferably pre-moulded slugs can be inserted to form the core 52. The shell 50 can be a non-magnetic, low conductivity, high-strength material such as a carbon-fibre composite or can be a ferromagnetic structure such as ferromagnetic steel, or a non-magnetic conducting material such as austenitic stainless steel.

Embodiments described above generally present a solid conducting face to a rapidly changing magnetic field. This can prevent flux penetration and distribution and induce unwanted localised heating and losses. In order to overcome or at least mitigate these effects, a person skilled in the art can adopt a pole-piece structure with frame support and various cores according to a fourth embodiment of the invention.

Figure 6:
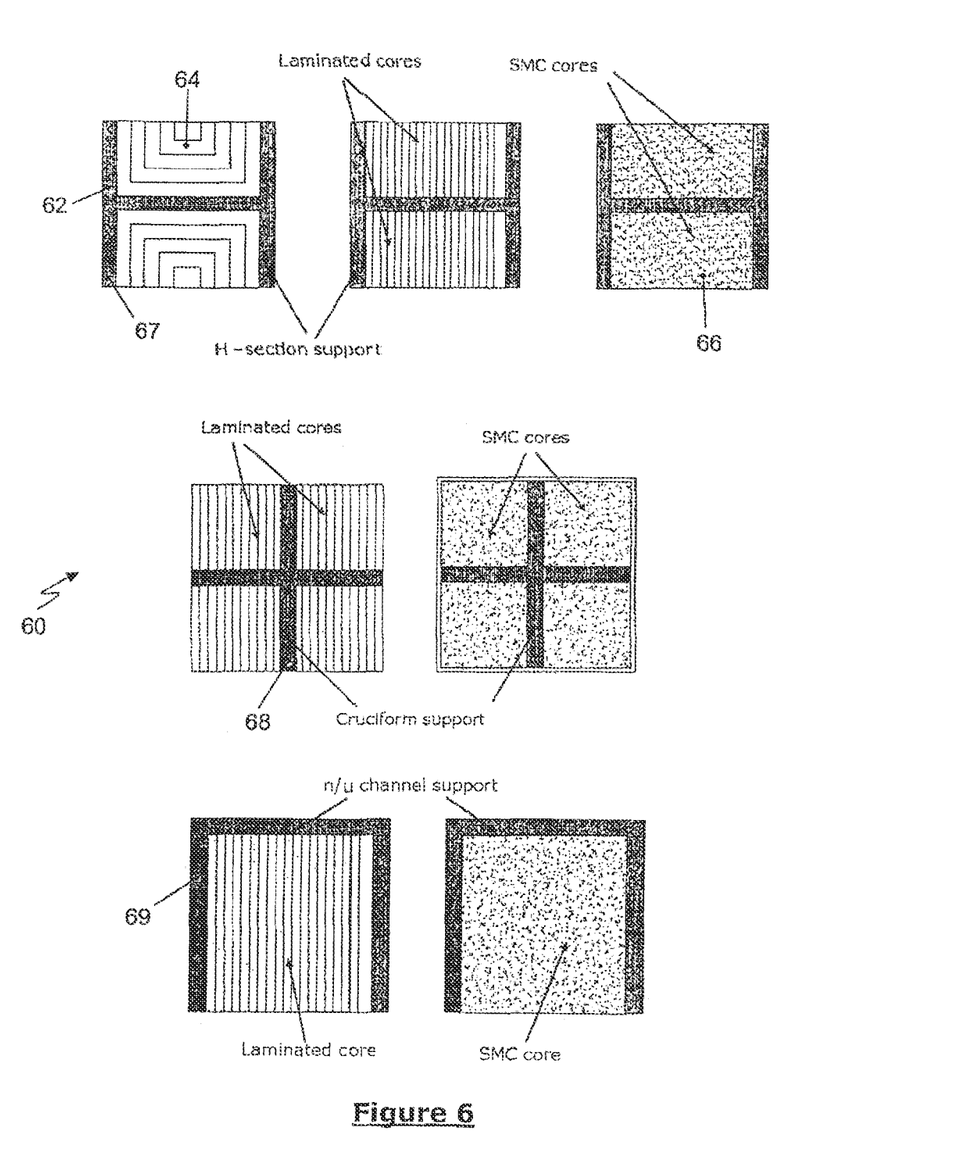
FIG. 6 is a schematic diagram of a pole-piece structure with frame support and various cores according to a fourth embodiment of the invention.

As best seen in FIG. 6, a pole-piece structure 60 with frame support 62 and various cores 64, 66 according to a fourth embodiment of the invention comprises a "H" section support 67, a cruciform section support 68 and a "U" section support 69. Embedded within the frame support is a magnetic material such as a laminated steel or a SMC material.

The H section support 67 and cruciform section support 68 are particularly advantageous for a pseudo direct drive because the face facing the high speed rotor and the stator both comprise a low conductivity. The low conductivity can prevent skin effects/screening due to the high speed inner rotor and due to the stator flux. The U section support 69 allows one laminated/SMC face to be exposed to an airgap. However, this face would be selected to face the high speed rotor in the gear. The other face which potentially has a solid conducting face can then be positioned to face the low speed rotor and so will not experience as high a rate of change of flux linkage.

As will be appreciated by a person skilled in the art, the laminated steel can be laminated in both an axial and a radial direction.

Figure 7A:
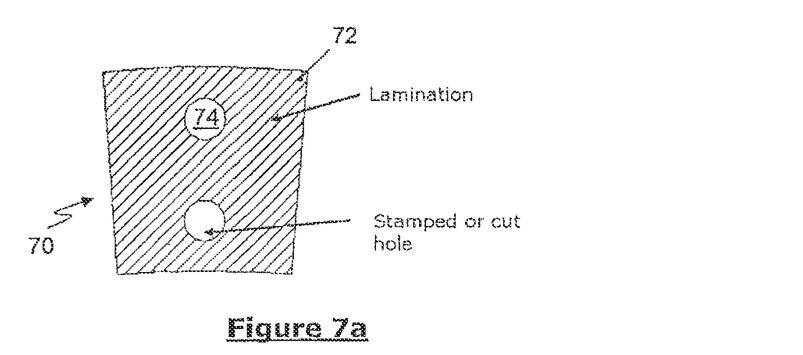
FIG. 7a is an end-view of a pole-piece provided by laminations with apertures to receive a support bar or the like according to a fifth embodiment of the present invention.

Referring to FIG. 7*a*, a fifth embodiment of the present invention provides an end-view of a pole-piece 70 provided by laminations 72 with apertures 74 to receive a support bar or the like.

Figure 7B:
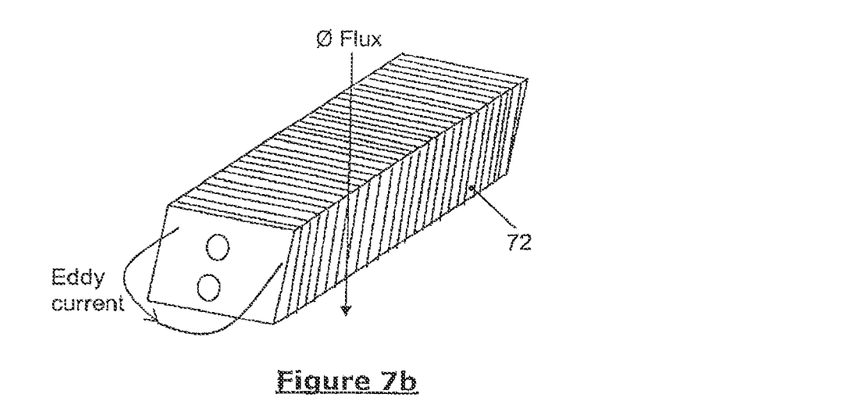

Reinforcement of the laminated pole-piece 70 is provided with the addition of a tubular or rod inserts through the laminations 72. The apertures 74 are arranged to achieve a given bending and torsional rigidity, while not compromising the magnetic flux paths. As best seen in FIG. 7*b*, a perspective view of the pole-piece of FIG. 7*a* comprises an array of laminations 72.

Figure 8A:
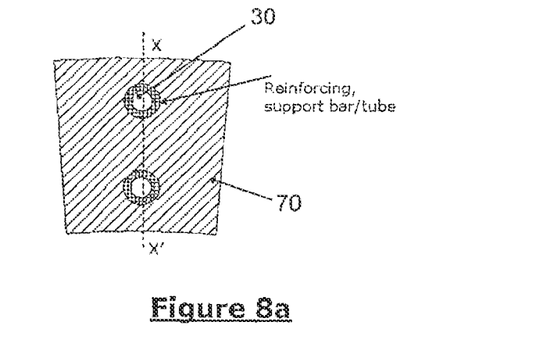
FIG. 8a is an end-view of a pole-piece showing an inset support bar or the like according to the fifth embodiment of the present invention.
Figure 8B:
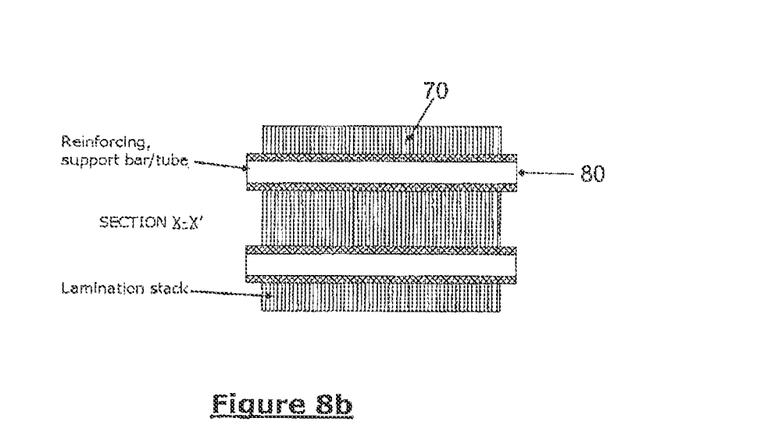

FIG. 8*a* is an end-view of the pole-piece 70 showing an inset support bar 80 or the like according to the fifth embodiment of the present invention. FIG. 8*b* shows a cross section of the pole piece 70 with a support bar 80 inserted. The support bar 80 can be a carbon fibre rod/tube for example. FIG. 8*b* shows the section X-X' of FIG. 8*a*, along the axial direction. The insert support bar 80 may be axially longer than the laminations 72 stack to provide a mechanical interface with as endplate and to allow the transmission of drive torque.

Figure 9:
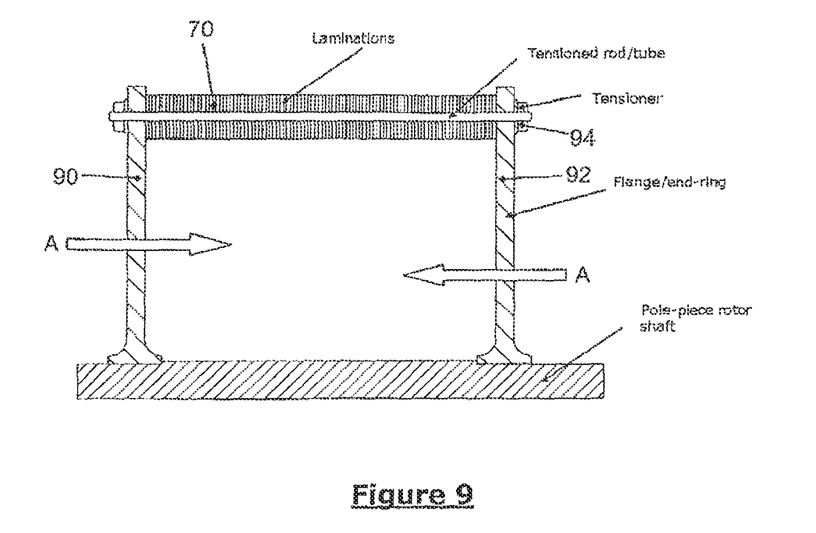
FIG. 9 is a schematic diagram of a tensioned pole-piece support according to a sixth embodiment of the present invention.

The support bar 80 can be put under tension. This may be achieved, for example, by having two flanges/end plates 90, 92 that are at a fixed distance, as shown in FIG. 9. A tensioning arrangement 94 (e.g. threaded fixing) can then be used to tension the support tubes/bars. Pre-tensioning would reduce the potential of deflection of the pole-piece components due to torques and forces present in the gear or pseudo direct drive. The pole-piece 70 lamination stack may have a shorter axial length than the support bar section between the endrings. A compressive element (spring or wavy washer) may be used to prevent the lamination stack from moving axially.

In such an arrangement the pole-piece lamination 70 stack is compressed due to being held under tension by a retaining part. In a further embodiment, the flange/end plates 90, 92 can be movable relative to each other along a direction A (as indicated in FIG. 9) in order to increase or decrease the tension and hence increase or decrease the compression of the pole-piece lamination 70 stack. At levels of high compression, the pole-piece lamination stack effectively acts as a solid bar.

Figure 10A:
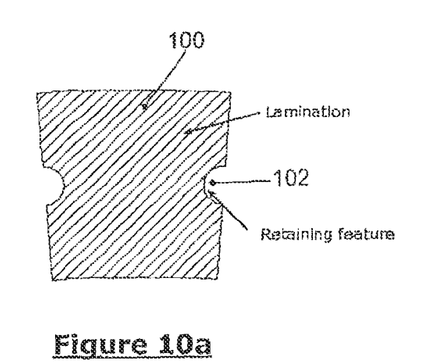
FIG. 10a is an end-view of a pole-piece provided with a retaining features according to a seventh embodiment of the present invention.
Figure 10B:
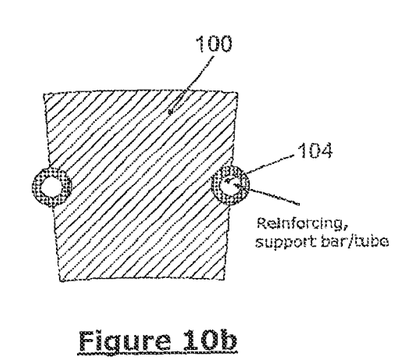
FIG. 10b is an end-view of a pole-piece provided with a support bar or the like according to the seventh embodiment of the present invention.
Figure 10C:
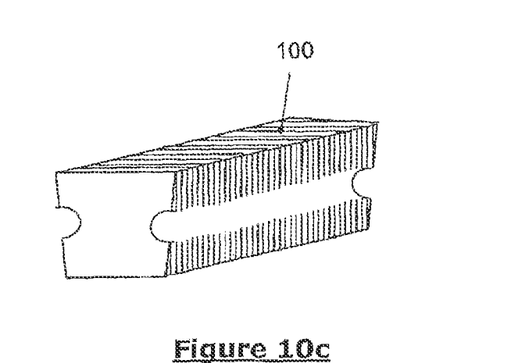

A similar arrangement to that described in FIGS. 8 and 9 is described with reference to FIG. 10. FIG. 10 illustrates a seventh embodiment of the present invention where laminations 100 are provided with cut-outs 102 on the outer edges of the laminations 100. This has the advantage of having negligible effect on the magnetic flux paths. As best seen in FIG. 10*b*, a supporting bar 104 or the like is provided along the cut-outs 102 to reinforce the laminations 100. FIG. 10*c* is a perspective view of a pole-piece of FIG. 10*a*.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A magnetic pole-piece configured for use in a magnetic gear or machine, the magnetic pole-piece comprising a magnetic part and a retaining part, wherein the retaining part supports the magnetic part, wherein the retaining part is a framework to which the magnetic part is secured, the magnetic pole-piece further configured to rotate about a center axis of the magnetic gear or machine, wherein the framework has a "U" shape, a cruciform shape, or an "H" shape in cross-section, the cross-section being perpendicular to a radius extending from the center axis, and wherein the retaining part is a carbon-fiber composite or a metallic structure.

2. A magnetic pole-piece as claimed in claim 1, wherein the magnetic part is provided by an array of laminate parts.

3. A magnetic pole-piece as claimed in claim 2, wherein the laminate part is an array of concentric laminate parts.

4. A magnetic pole-piece as claimed in claim 3, wherein each concentric laminate part has a circular cross section.

5. A magnetic pole-piece as claimed in claim 3, wherein each concentric laminate part has a square cross section.

6. A magnetic pole-piece as claimed in claim 1, wherein the magnetic part is provided by a soft magnetic composite material.

7. A magnetic pole-piece as claimed in claim 1, wherein retaining part is a non-magnetic material.

8. A magnetic pole-piece as claimed in claim 1, wherein the retaining part is embedded within the magnetic part.

9. A magnetic pole-piece as claimed in claim 1, wherein the retaining part provides an outer sheath around a core comprising the magnetic part.

10. A magnetic pole-piece as claimed in claim 9, wherein the core comprises an array of laminations or a soft magnetic composite material.

11. A magnetic pole-piece as claimed in claim 1 comprising a magnetic part and a retaining part, wherein the retaining part is a reinforcing support bar.

12. A magnetic pole-piece as claimed in claim 11, wherein the reinforcing support bar is a tensioned reinforcing support bar.

13. A magnetic pole-piece as claimed in claim 11, wherein the magnetic part is an array of laminations and the reinforcing support bar is disposed in an aperture along the length of the array.

14. A magnetic pole-piece as claimed in claim 11, wherein the magnetic part is an array of laminations and the reinforcing support bar is disposed along an outer edge of the laminations along the length of the array.

15. A magnetic pole-piece as claimed in claim 14, wherein the laminations comprise a retaining feature along their edge.

16. A magnetic pole-piece as claimed in claim 11, wherein the lamination stack is held under compression by the tension in the reinforcing support bar.

17. A magnetic pole-piece as claimed in claim 16, wherein the lamination stack is held under compression between two end plates.

18. A magnetic pole piece as claimed in claim 16, wherein the lamination stack is held under compression by a retaining part disposed between the lamination stack and at least one of two end plates.

19. A magnetic pole-piece structure as claimed in claim 1, comprising a magnetic part and a retaining part, wherein the retaining part supports the magnetic part and the magnetic pole-piece structure is two-part.

20. An electrical machine comprising integral magnetic gearing, the integral magnetic gearing having a plurality of magnetic pole pieces as claimed in claim 1 and two sets of permanent magnets having different numbers of magnetic poles; wherein a winding is disposed relative to the integral magnetic gearing so as to interact magnetically with the fundamental harmonic of the magnetic field of one of the sets of permanent magnets associated with the integral magnetic gearing.

21. A magnetic drive system comprising three members, a first and second of which form an input member and an output member each arranged to rotate relative to the third member, wherein two of the members have respective sets of permanent magnets, the two sets having different numbers of magnetic poles, and the other of the members comprising a plurality of magnetic pole pieces as claimed in claim 1.

22. A magnetic pole-piece as claimed in claim 1, wherein the framework is elongate along as axis and when the framework is viewed in cross-section perpendicular to the axis, the framework is a "U" shape, a cruciform shape, or a "H" shape.

23. A magnetic drive system comprising three members, a first and second of which form an input member and an output member each arranged to rotate relative to the third member, wherein two of the members have respective sets of permanent magnets, the two sets having different numbers of magnetic poles, and the other of the members comprising a plurality of magnetic pole pieces as claimed in claim 1, wherein the framework is a cruciform shape or a "H" shape such that each of the plurality of magnetic pole pieces has a first side facing the first member and a second side facing the second member and each of the first side and the second side comprise a low conductivity.

24. A magnetic drive system comprising three members, a first and second of which form an input member and an output member each arranged to rotate relative to the third member, wherein two of the members have respective sets of permanent magnets, the two sets having different numbers of magnetic poles, and the other of the members comprising a plurality of magnetic pole pieces as claimed in claim 1, wherein the framework is a "U" shape such that each of the plurality of magnetic pole pieces has a first side facing the first member and a second side facing the second member, the first side having a solid conducting face.

25. A magnetic pole-piece as claimed in claim 1, wherein the framework stiffens the pole-piece and also provides for a low conductivity of a face facing a high speed rotor.

26. A magnetic pole-piece configured for use in a magnetic gear or machine, the magnetic pole-piece comprising a high strength portion and a low-conductivity portion, the high strength portion provided by a retaining structure and the low-conductivity structure provided by an array of laminate parts or a soft magnetic composite material supported by the retaining structure, the magnetic pole-piece further configured to rotate about a center axis of the magnetic gear or machine, the retaining structure comprising a framework that has a "U" shape, a cruciform shape, or an "H" shape in cross-section, the cross-section being perpendicular to a radius extending from the center axis, and wherein the retaining part is a carbon-fiber composite or a metallic structure.

27. A magnetic pole-piece configured for use in a magnetic gear or machine, the magnetic pole-piece comprising an array of laminate parts secured in place by a retaining structure, the magnetic pole-piece further configured to rotate about a center axis of the magnetic gear or machine, the retaining structure comprising a framework that has a "U" shape, a cruciform shape, or an "H" shape in cross-section, the cross-section being perpendicular to a radius extending from the center axis, and wherein the retaining part is a carbon-fiber composite or a metallic structure.

28. A magnetic pole-piece configured for use in a magnetic gear or machine, the magnetic pole-piece comprising a soft magnetic composite material secured in place by a retaining structure, the magnetic pole-piece further configured to rotate about a center axis of the magnetic gear or machine, the retaining structure comprising a framework that has a "U" shape, a cruciform shape, or an "H" shape in cross-section, the cross-section being perpendicular to a radius extending from the center axis, and wherein the retaining part is a carbon-fiber composite or a metallic structure.

* * * * *